(12) United States Patent
Kolychev et al.

(10) Patent No.: US 10,965,708 B2
(45) Date of Patent: Mar. 30, 2021

(54) SYSTEMS AND METHODS FOR MACHINE LEARNING BASED APPLICATION SECURITY TESTING

(71) Applicant: WHITEHAT SECURITY, INC., Santa Clara, CA (US)

(72) Inventors: Sergey Kolychev, Portland, OR (US); Robert Stone, Fremont, CA (US); James Richardson, Houston, TX (US)

(73) Assignee: WHITEHAT SECURITY, INC., Santa Clara, CA (US)

( * ) Notice: Subject to any disclaimer, the term of this patent is extended or adjusted under 35 U.S.C. 154(b) by 186 days.

(21) Appl. No.: 16/001,812

(22) Filed: Jun. 6, 2018

(65) Prior Publication Data
US 2019/0377880 A1    Dec. 12, 2019

(51) Int. Cl.
*H04L 29/06* (2006.01)
*G06F 21/57* (2013.01)
*G06N 3/04* (2006.01)
*G06N 3/08* (2006.01)

(52) U.S. Cl.
CPC ........ *H04L 63/1433* (2013.01); *G06F 21/577* (2013.01); *G06N 3/0445* (2013.01); *G06N 3/0454* (2013.01); *G06N 3/08* (2013.01); *G06F 2221/034* (2013.01)

(58) Field of Classification Search
CPC ............ G06F 21/577; G06F 2221/034; G06N 3/0445; G06N 3/0454; G06N 3/08; H04L 63/1433
See application file for complete search history.

(56) References Cited

U.S. PATENT DOCUMENTS

| 5,577,166 | A  | * | 11/1996 | Mizuno | G06K 9/6254 |
| | | | | | 706/20 |
| 9,083,556 | B2 | * | 7/2015 | Choi | H04L 51/12 |
| 10,558,809 | B1 | * | 2/2020 | Joyce | G06N 20/00 |
| 10,565,498 | B1 | * | 2/2020 | Zhiyanov | G06N 3/0445 |
| 2003/0004689 | A1 | * | 1/2003 | Gupta | G06F 21/55 |
| | | | | | 702/188 |

(Continued)

FOREIGN PATENT DOCUMENTS

WO    WO-2011019720 A1 *   2/2011   ............ H04L 51/12

OTHER PUBLICATIONS

Lianbing, Zhou; "Study on Applying the Neural Network in Computer Network Security Assessment", Eighth International Conference on Measuring Technology and Mechatronics Automation (ICMTMA), IEEE, Mar. 11-12, 2016, pp. 639-642.*

(Continued)

*Primary Examiner* — Victor Lesniewski
(74) *Attorney, Agent, or Firm* — Polsinelli PC

(57) ABSTRACT

Discloses are systems, methods and computer readable mediums for automated verifications of potential vulnerabilities of one or more sites or code utilizing one or more neural networks. The systems, methods and computer readable mediums can transmit one or more scan operations to one or more sites, receive one or more responses to the one or more scan operations, tokenize the one or more responses, transmit to one or more neural networks the one or more tokenized responses, receive from the one or more neural networks verification of the one or more tokenized responses, and determine one or more confidences of the one or more verified responses.

24 Claims, 10 Drawing Sheets

(56) References Cited

U.S. PATENT DOCUMENTS

| | | | |
|---|---|---|---|
| 2013/0174262 A1* | 7/2013 | Amit | G06F 21/577 |
| | | | 726/25 |
| 2014/0047546 A1* | 2/2014 | Sidagni | G06F 21/577 |
| | | | 726/25 |
| 2016/0315961 A1* | 10/2016 | Duer | H04L 63/1433 |
| 2017/0011738 A1* | 1/2017 | Senior | G10L 15/063 |
| 2017/0264378 A1* | 9/2017 | Simpson | G06F 21/577 |
| 2017/0318035 A1* | 11/2017 | Baughman | G06N 3/08 |
| 2017/0366562 A1* | 12/2017 | Zhang | G06N 20/00 |
| 2018/0026944 A1* | 1/2018 | Phillips | H04L 63/1433 |
| | | | 726/4 |
| 2018/0101681 A1* | 4/2018 | Davis | G06F 21/564 |
| 2018/0268298 A1* | 9/2018 | Johansen | G06F 40/30 |
| 2018/0275642 A1* | 9/2018 | Tajima | G06N 3/0472 |
| 2018/0285186 A1* | 10/2018 | Godefroid | H04L 63/1433 |
| 2018/0293488 A1* | 10/2018 | Dang | G06N 3/082 |
| 2018/0367561 A1* | 12/2018 | Givental | G06N 20/00 |
| 2019/0050319 A1* | 2/2019 | Gondalia | G06F 11/3664 |
| 2019/0052665 A1* | 2/2019 | Mahieu | G06N 3/04 |
| 2019/0273509 A1* | 9/2019 | Elkind | G06F 21/562 |
| 2019/0273510 A1* | 9/2019 | Elkind | G06F 8/74 |
| 2019/0327259 A1* | 10/2019 | DeFelice | G06N 3/0472 |
| 2019/0370473 A1* | 12/2019 | Matrosov | G06K 9/6256 |

OTHER PUBLICATIONS

Ito, Michiaki; Iyatomi, Hitoshi; "Web Application Firewall using Character-level Convolutional Neural Network", 14th International Colloquium on Signal Processing & Its Applications (CSPA), IEEE, Mar. 9-10, 2018, pp. 103-106.*

* cited by examiner

| Identifier | HTTP request-id/response-id pair | Scan Site | Scan Type | Metadata | Verified | Remediation | Timestamp |
|---|---|---|---|---|---|---|---|
| 12345 | 12345/12345_1 | Site A | Surface | url | Yes | patch 1.X | 3/4/17: 23:14:01 |
| 23456 | 23456/23456_1 | Site A | Surface | url | False Positive | - | 3/4/17: 23:14:45 |
| 34567 | 34567/34567_1 | Site A | Surface | url | False Positive | - | 3/4/17: 23:15:14 |
| 45678 | 45678/45678_2 | Site A | Login | admin/pass | False Positive | - | 3/4/17: 23:23:04 |
| 56789 | 56789/56789_2 | Site A | Login | admin/pass | False Positive | - | 3/4/17: 23:25:54 |
| 67890 | 67890/67890_2 | Site A | Login | admin/pass | False Positive | - | 3/4/17: 23:30:32 |
| 78901 | 78901/78901_2 | Site A | Form | form fields | False Positive | - | 3/4/17: 23:31:05 |
| 89012 | 89012/89012_3 | Site A | Form | form fields | False Positive | - | 3/4/17: 23:46:04 |
| 90123 | 90123/90123_3 | Site A | Form | form fields | False Positive | - | 3/4/17: 23:47:39 |
| 98765 | 98765/98765_3 | Site A | Form | form fields | False Positive | - | 3/4/17: 23:52:28 |
| 87654 | 87654/87654_3 | Site A | Form | form fields | Yes | patch 2.1.X | 3/4/17: 23:54:50 |
| 76543 | 76543/76543_3 | Site A | Detailed | test id | False Positive | - | 3/4/17: 23:55:12 |
| 65432 | 65432/65432_4 | Site A | Detailed | test id | False Positive | - | 3/4/17: 23:58:28 |
| 54321 | 54321/54321_4 | Site A | Detailed | test id | False Positive | - | 3/5/17: 00:01:34 |
| 43210 | 43210/43210_4 | Site A | Detailed | test id | Yes | patch 1.4.X | 3/5/17: 00:04:41 |
| 32109 | 32109/32109_4 | Site A | Detailed | test id | False Positive | - | 3/5/17: 00:06:34 |
| 21098 | 21098/21098_4 | Site A | Detailed | test id | False Positive | - | 3/5/17: 00:09:00 |
| 10987 | 10987/10987_4 | Site A | Detailed | test id | False Positive | - | 3/5/17: 00:16:39 |
| 9876 | 09876/09876_4 | Site A | Detailed | test id | Yes | patch 2.1.X | 3/5/17: 01:30:29 |

SYSTEMS AND METHODS FOR MACHINE LEARNING BASED APPLICATION SECURITY TESTING

TECHNOLOGY

The present technology pertains to vulnerability detection in application code and more particularly using machine learning techniques for autonomous detection of vulnerabilities in application code.

BACKGROUND

Modern computer systems can provide access to services using web-based interfaces. In such an access model, clients connect to servers over a network such as the Internet, through a web-based interface, which can allow access to services operating on the servers using Internet protocols or interfaces. Maintaining the security of such web-based interfaces and the security of the services that are supported by those interfaces can be difficult, particularly when client devices are not always trusted. Maintaining the security of such systems can be made more difficult when the scope and type of security vulnerabilities frequently change, along with identification and verification of theses security vulnerabilities.

In some situations, a finer level of verification is required for the security vulnerabilities. Machine learning techniques, for example neural networks, can be taught to perform the finer level of verification. Machine learning is capable of analyzing large data sets that continue to increase (i.e., highly scalable). Utilizing various machine learning techniques and frameworks data sets can be analyzed to extract patterns and correlations that may otherwise have never been noticed when subject to only human analysis. Tailored data inputs can enable machine learning system to learn a desired operations, functions, and/or patterns. The training process can be complicated by the fact that the machine learning system's inner functionality remains largely nontransparent to human analysis and the that the training data can easily be biased, too small, or both of which result in faulty and/or insufficient training.

BRIEF DESCRIPTION OF THE FIGURES

Disclosed are systems, methods and non-transitory computer-readable mediums for verifying potential vulnerabilities using neural networks. The systems, methods and non-transitory computer-readable medium can include being configured to transmit one or more scan operations, receive one or more responses to the one or more scan operations, tokenize the one or more responses, transmit to one or more neural networks the one or more tokenized responses, receive from the one or more neural networks verification of the one or more tokenized responses, and determine one or more confidences of the one or more verified responses.

The systems, methods and non-transitory computer-readable medium can also include the scan operations being a hypertext transport protocol request and the response is a hypertext transport protocol response.

The systems, methods and non-transitory computer-readable medium can also include being configured to automatically identify one or more potential vulnerabilities in the one or more responses, in response to the identification of the one or more potential vulnerability determine one or more lengths of the excerpts of one or more responses (e.g., array of characters for input into a neural network), take one or more excerpts of varied lengths from the one or more responses, and convert the one or more excerpts into one or more tokens.

The systems, methods and non-transitory computer-readable medium can also include the identification being performed using matched expressions. The systems, methods and non-transitory computer-readable medium can also include the one or more neural networks being trained by historical request and response pairs. The systems, methods and non-transitory computer-readable medium can also include the one or more neural networks being one of a character-level convolutional neural network or long short term memory recurrent neural networks.

The systems, methods and non-transitory computer-readable medium can also include the one or more confidences associated with the one or more responses being based on a ratio the neural network has properly identified the one or more potential vulnerability.

BRIEF DESCRIPTION OF THE FIGURES

Figure 1A:
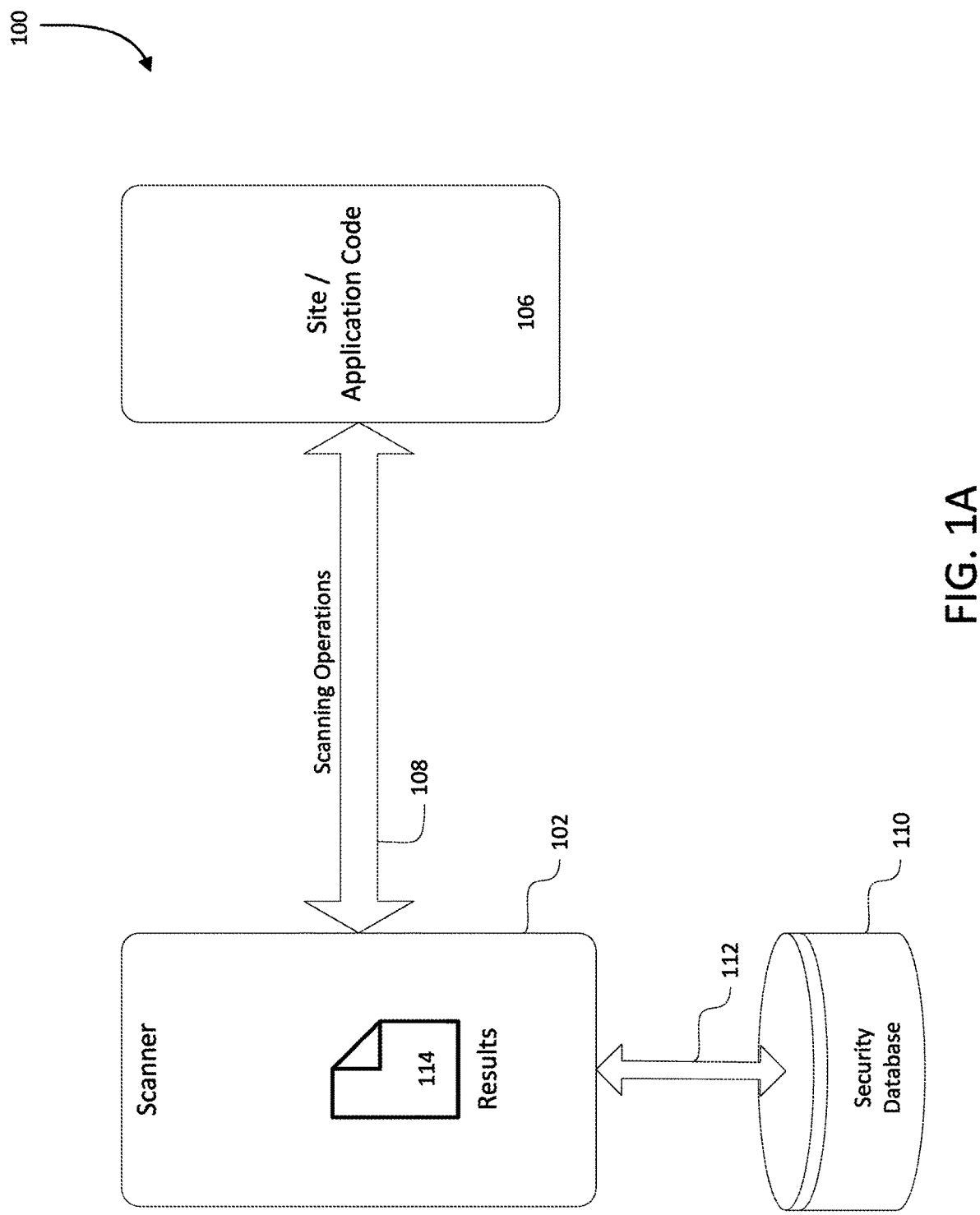
Figure 1B:
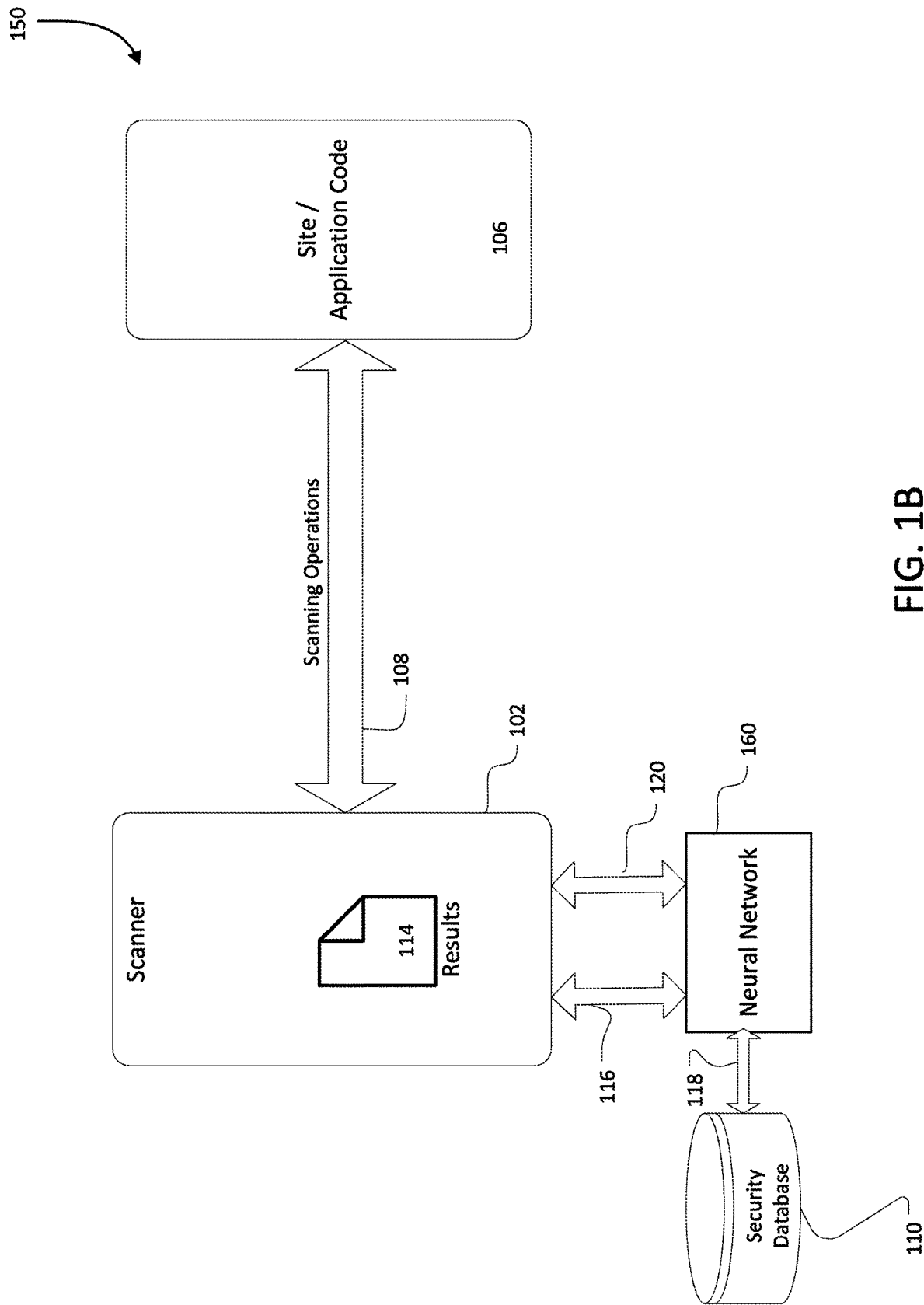
Figure 2A:
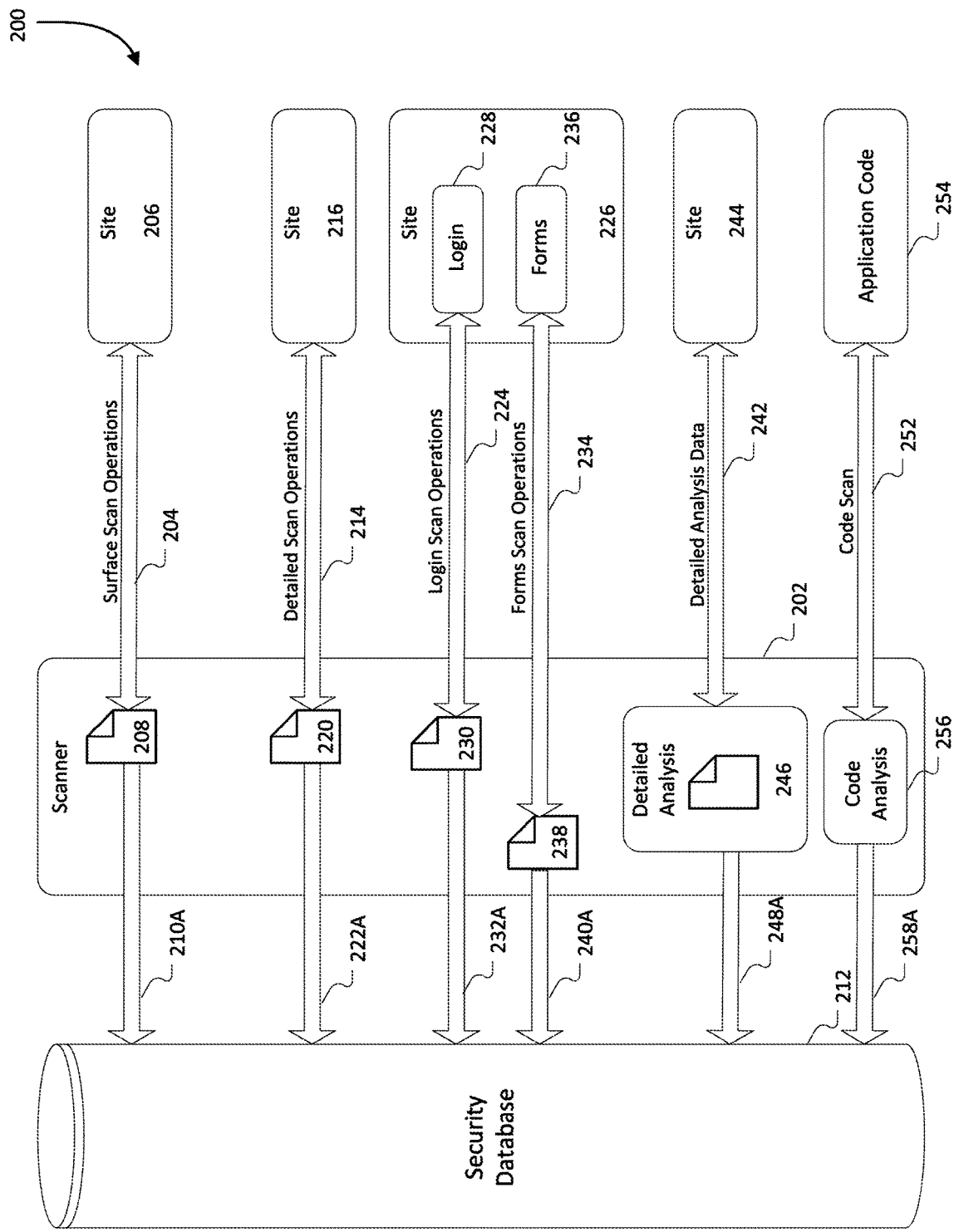
Figure 2B:
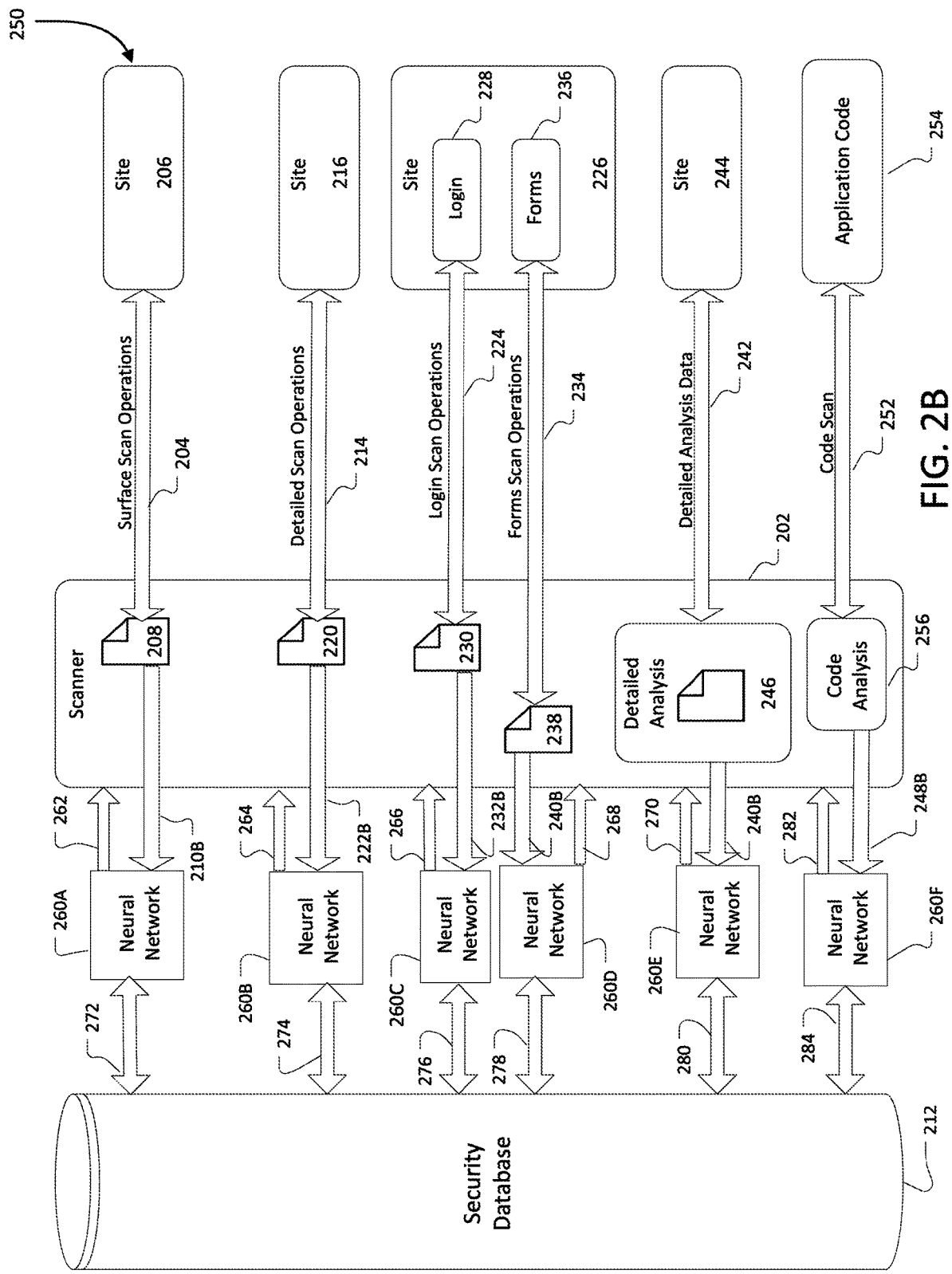
Figure 4:
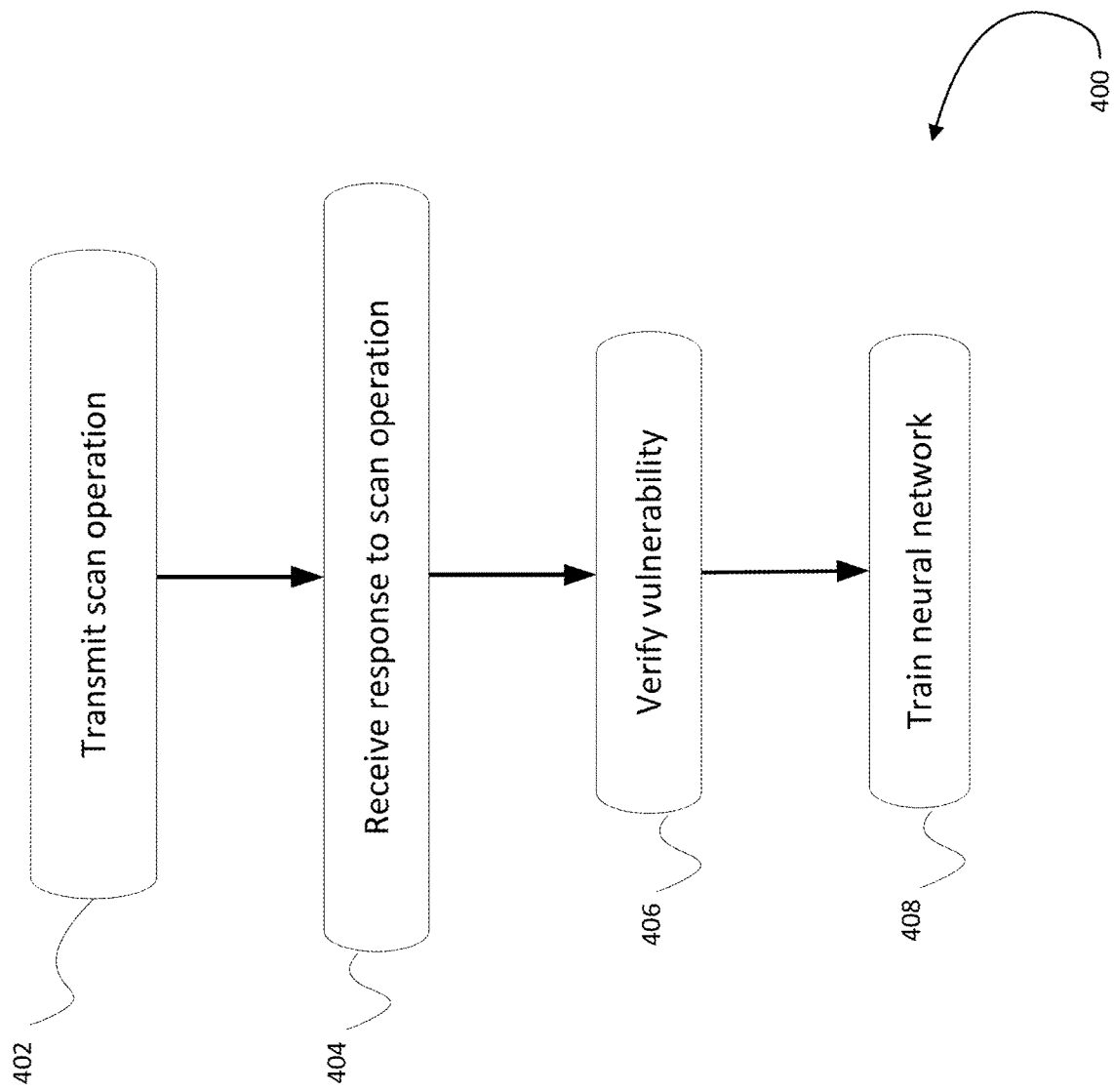
Figure 5A:
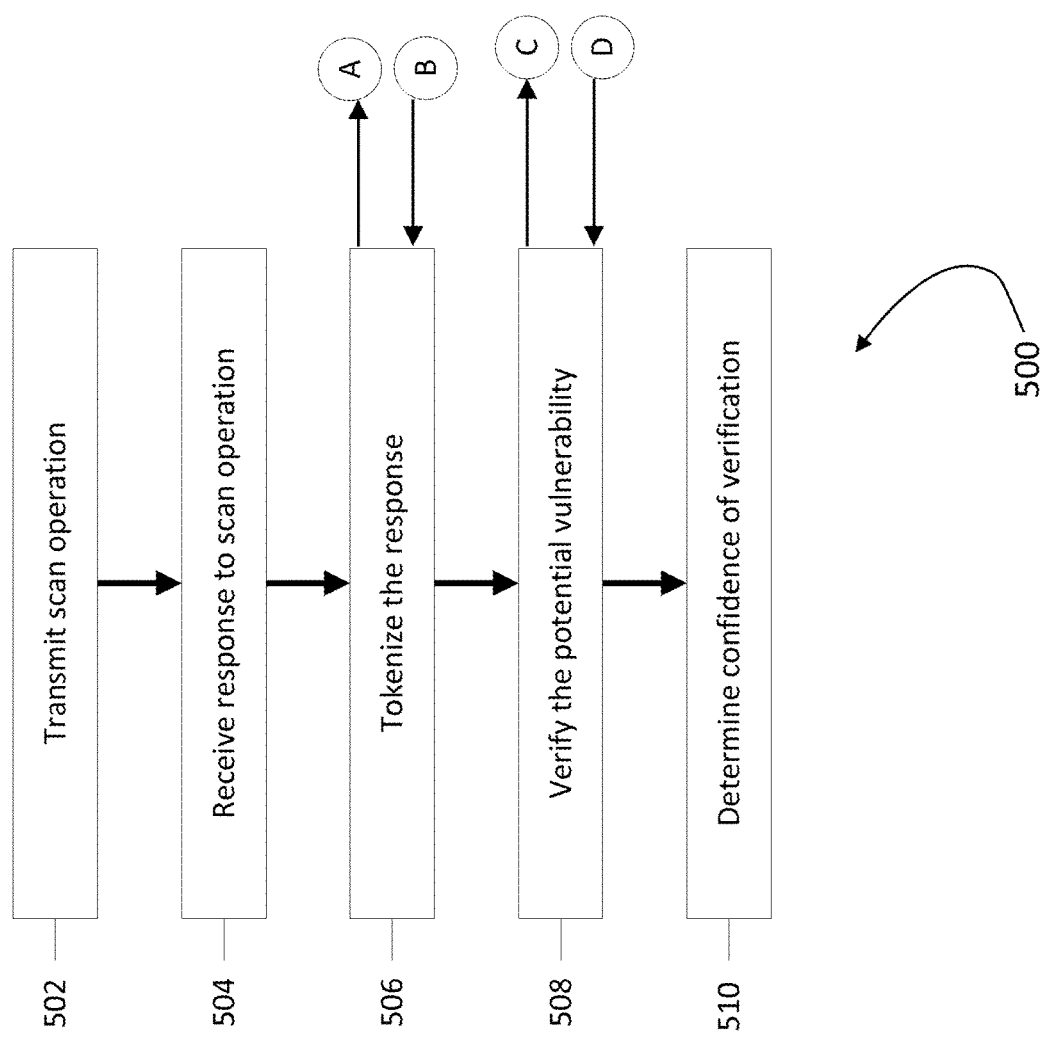
Figure 5B:
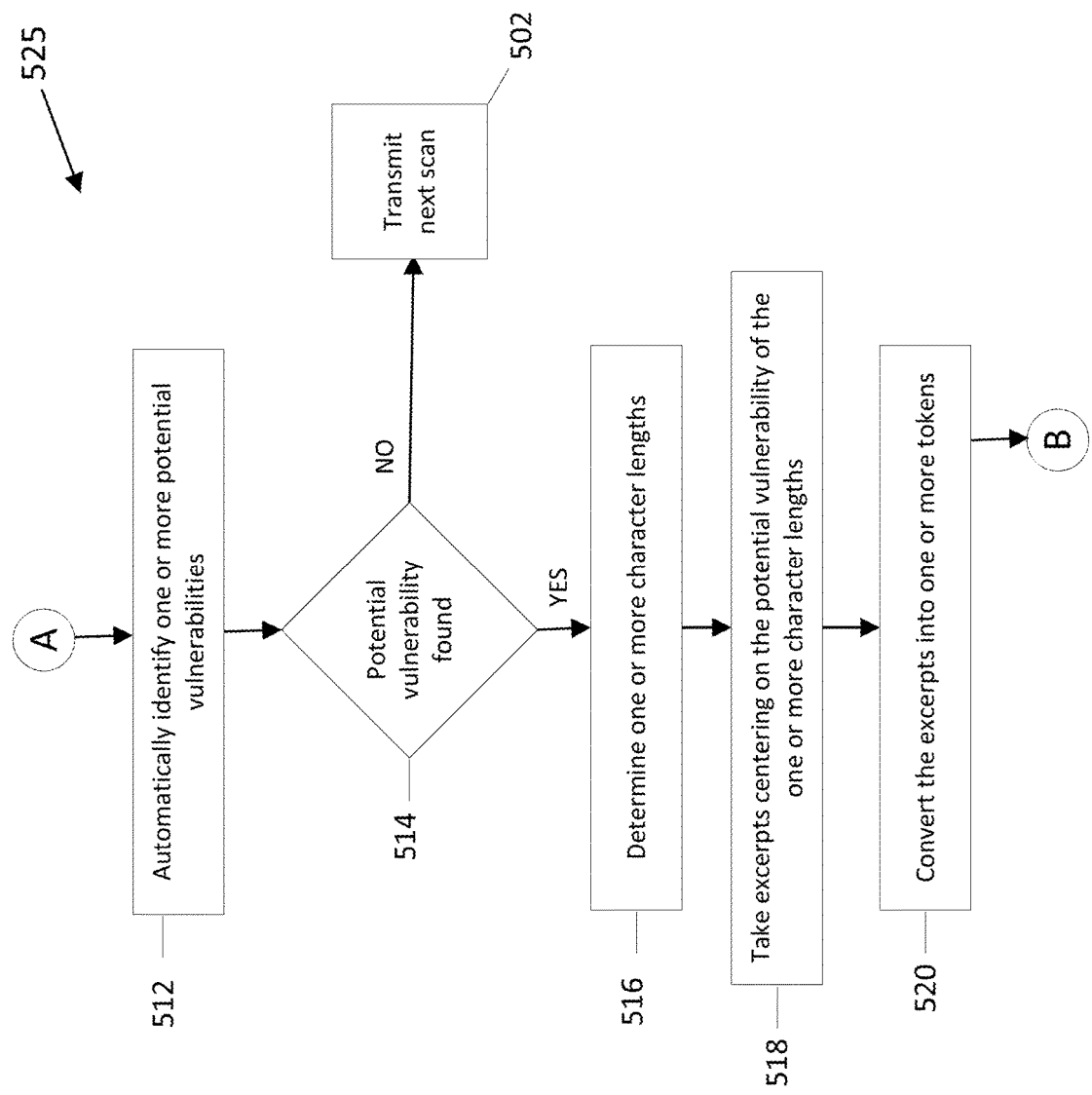
Figure 5C:
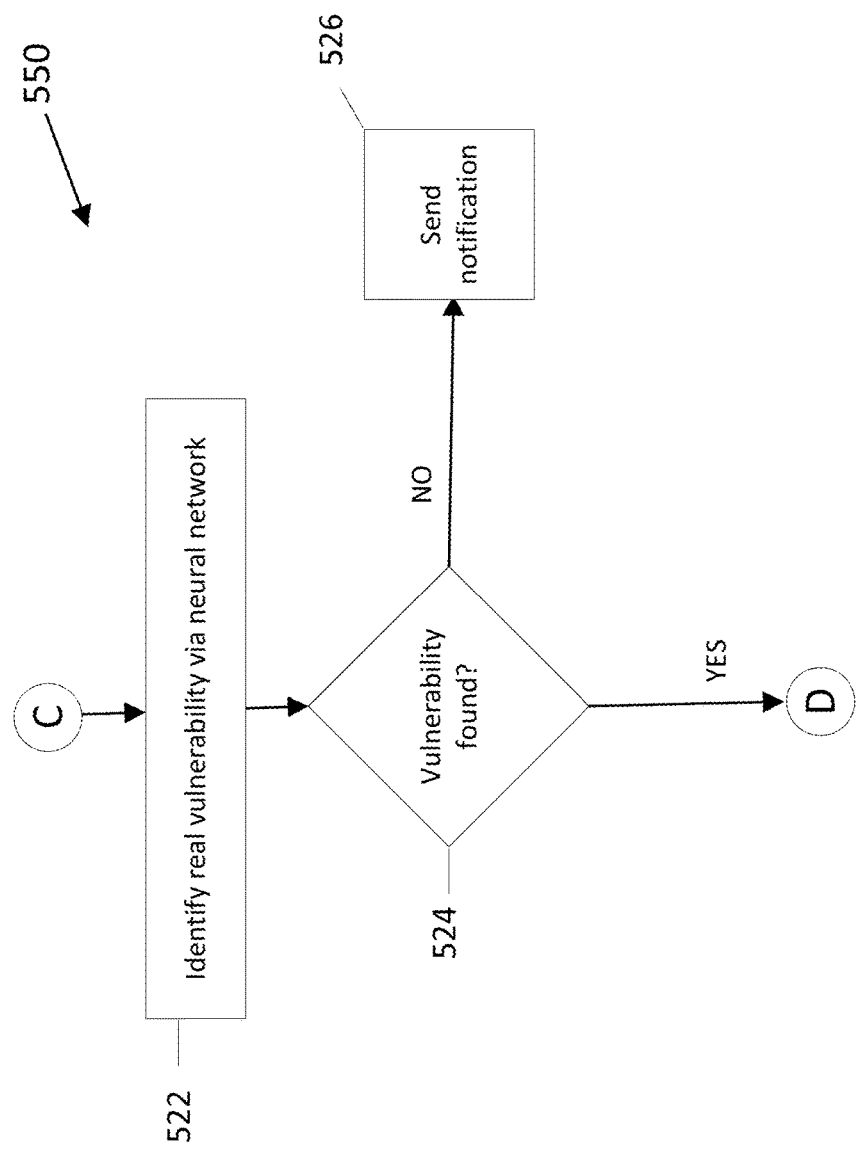
Figure 6:
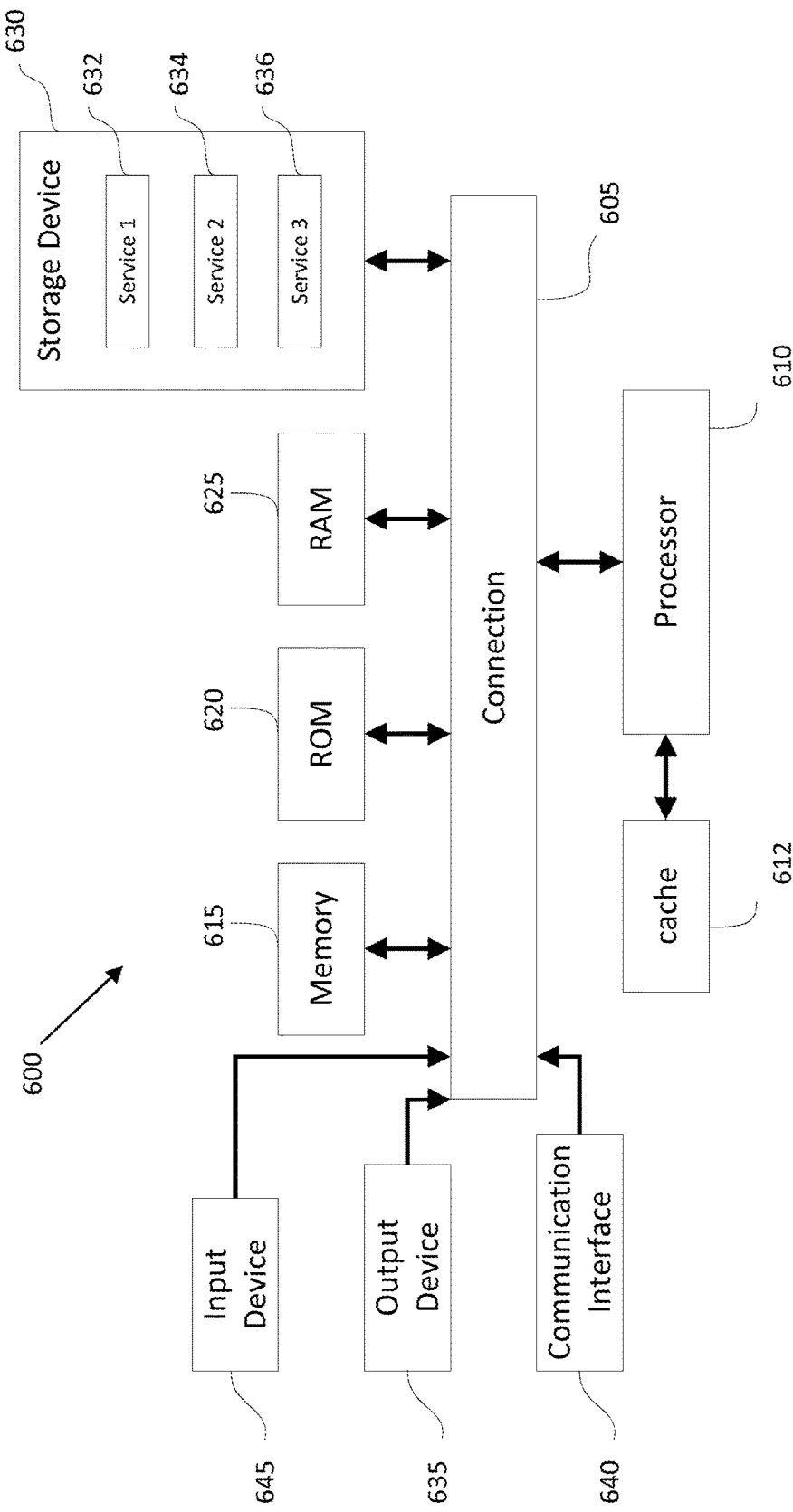

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1A illustrates an example environment for scanning a site in accordance with an embodiment;

FIG. 1B illustrates an example machine learning environment for scanning a site in accordance with an embodiment;

FIG. 2A illustrates an example environment for scanning sites in accordance with an embodiment;

FIG. 2B illustrates an example machine learning environment for scanning sites in accordance with an embodiment;

FIG. 3 illustrates an example data set in accordance with an embodiment;

FIG. 4 illustrates an example process for training neural networks in accordance with an embodiment;

FIGS. 5A-C illustrate example processes for determining vulnerabilities with a neural network in accordance with an embodiment; and FIG. 6 illustrates an example system in which various embodiments can be implemented.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Techniques described and suggested herein include methods, systems and processes to detect potential vulnerabilities of sites hosting web services (also referred to herein as "websites" or, more simply, as "sites"), source code and/or representations thereof. The methods, systems and processes can be configured to perform site security analyses of a plurality of websites. These site security analyses can be used to more quickly and accurately identify security vulnerabilities associated with those websites and to identify and verify the vulnerabilities via machine learning. Potential vulnerabilities can be broken into two classes: vulnerability or a false positive. For example, initial review of the responses can indicate a potential vulnerability, however, upon verification of the potential vulnerability it can be determined the potential vulnerability is not an actual vulnerability, i.e. it is a false positive.

In some situations, a finer level of verification is required for confirmation of the potential vulnerabilities. This finer level of verification can include machine learning techniques. In some instances, the finer level of verification, along with the potential vulnerability, remediation and any associated metadata can be used to train a neural network. A trained neural network can provide the finer level of verification, for example, provide fully autonomous detection, verification and remediation of potential vulnerabilities.

In some instances, determining potentially vulnerabilities can be performed through an attempt to gain access to the website using a simulated attack. Such a simulated attack can cause a site with vulnerabilities to fail, become unresponsive, or become modified in unintended and/or dangerous ways, which can have drastic consequences. Such a simulated attack can also be expensive or computationally difficult and, with more complex sites, can require authentication and/or knowledge about the site structure in order to provide a full vulnerability analysis. The authentication can be based on one or more authentication attributes including, but not limited to, usernames, passwords, certificates, cryptographic keys, site profiles, security policies, or other such attributes. The vulnerability analysis can be performed while limiting potentially negative effects on the site to determine real and/or implied vulnerabilities without doing a destructive scan of the site. The vulnerability analysis can be configured to perform authorized attacks (e.g., by attempting potentially damaging actions) and can also be configured to perform scans on sites to note potential vulnerabilities for later analysis. For example, an authorized attack can attempt a denial of service attack and can gather data about the site based on the response to that attack. Such an authorized attack is a type of scan, which can be configured to identify vulnerabilities in a site. In some examples, the vulnerability analysis can be configured to detect data stored in a public location that can appear to be usernames and passwords. Such detections (also referred to herein as a "crawls" of a site) are configured to identify portions of a site where vulnerabilities can exist. Crawls of a site can also be configured to, for example, detect insecure forms submission actions, or to detect improperly protected site cookies, or to detect other such potential security vulnerabilities.

In some examples, the systems and methods can be referred to as a scanner. A scanner can be a computer system that is configured to scan the security of sites (e.g., websites, source code, application code, etc.) by scanning those sites and to perform one or more operations to analyze security vulnerabilities associated with those sites. A scanner can be a physical computer system with executable code operating thereon, or can be a virtual computer system with executable code operating thereon, or can be a collection of such physical and/or virtual computer systems operating collectively. For example, the scanner can operate as a collection of virtual machines on a network such as the Internet and using computer resources provided by a computing resources service provider. In another example, a scanner can be configured to operate on a server, wherein the server is a physical computer system that is connected to a network such as the Internet and that is configured to use that network connection to scan other sites on the network. In some examples, metrics can be established by first establishing one or more criteria such as, the length of time that the site has had scans performed by the scanner (i.e., how long the scanner has been in service and scanning the site), how frequently the site is scanned by the scanner, whether various compliance metrics associated with the site have been met, how complex the site is, or other such criteria.

A scanner can then be configured to measure parameters and their values associated with the one or more criteria, and can also be configured to examine both current and past parameters and their values in order to establish a history of those parameters. In an embodiment, the lack of an expected parameter and/or an expected parameter value can also be measured (or noted) by the scanner. For the purposes of illustration, the criteria and/or the parameters can be collectively referred to herein as "factors" or as "security factors." A scanner can also be configure to measure, for example, a change in value of that parameter from one value (e.g., a value that represents the lack of a vulnerability) to another value (e.g., a value that represents the presence of a vulnerability). From the parameter history, a probability distribution can be determined for one or more of the parameters and, from that probability distribution, a distribution function (also referred to herein as a cumulative distribution function) can be determined. The distribution function can then be used to model, based on the parameter history, the probability that a parameter will have a certain value at a point in the future, the length of time that a parameter is likely to remain in a changed state, the length of time between parameter changes, or other parameter relationships.

For example, one factor associated with a metric can be whether a site is compliant with the Payment Card Industry Data Security Standard ("PCI DSS" or simply "PCI") for processing, storing, or transmitting cardholder data. Compliance with PCI DSS can require, for example, that a site conforms to validation types, performs validations, maintains security standards, performs timely software updates, submits to periodic scans, or other such requirements. A system can be configured to measure one or more parameters with these PCI DSS requirements to determine whether the site is compliant. A system can also be configured to allow a third-party system to determine compliance. In an embodiment, the PCI DSS compliance parameter is a binary value with a value of one (or true) if the system is compliant when the parameter is measured and a value of zero (or false) if the system is not compliant when the parameter is measured. Based on a plurality of measurements of this parameter, machine learning, for example neural networks, can be trained to determine the probability that the site can, for example, be compliant with PCI DSS at some determined point in the future (i.e., the probability that the vulnerability will be fixed by a certain date). Such a probability, and other parameters and factors, can be used to train future neural networks. Such a probability can also be used to correct for calculations based on different service levels as described herein.

Description

The disclosed technology addresses the need in the art for autonomous detection, verification and remediation of potential vulnerabilities in websites, source code, etc. Disclosed are systems, methods, and computer-readable storage media for detecting vulnerabilities using static and dynamic techniques, using the detection results and historical detection results to train one or more neural networks, verifying the detected vulnerabilities using the trained neural networks and remediating the detected vulnerabilities. A description of an example machine learning environments, as illustrated in FIGS. 1A-2B, are first disclosed herein. A discussion of example data sets as illustrated in FIG. 3 will then follow. A discussion of example processes for training neural networks as illustrated in FIG. 4 will then follow. A discussion of an example process for detecting vulnerabilities using the neural networks as illustrated in FIGS. 5A-C will then follow. The discussion then concludes with a description of example devices, as illustrated in FIG. 6. These variations shall be described herein as the various embodiments are set forth. The disclosure now turns to FIG. 1A.

FIG. 1A illustrates an example environment 100 for scanning (e.g., detect vulnerabilities) a site. In some examples, a scanner can be utilized to monitor and scan source code, application code, representations thereof, etc. Scanner 102 can perform one or more scanning operations 108 on site 106. Site 106 (e.g., a website, source code, etc.) can be one of a plurality of sites (e.g., provided by a site operator, the owner and/or operator of the site) that can be part of one or more domains. An operator can be a trusted operator such as a customer (e.g., a client or user of the scanner), can be an untrusted operator such as a non-customer, or can be unknown. A site can be a domain with a plurality of hosts (for example, "example.com"), or a subdomain with a plurality of hosts (for example, "subdomain.example.com"), or a single host (for example, "host.example.com"), or a service running on a host (for example, "https://host.example.com/service"), or can be some other site type. Scanner 102 can perform the one or more scanning operations 108 on the site 106 for one or more potential vulnerabilities, as described herein. In some examples, one or more scanning operations 108 can include transmitting one or more HTTP requests to site 106 and receiving back from site 106 one or more HTTP responses. The one or more potential vulnerabilities can be at least a portion of the one or more HTTP responses.

The responses can be analyzed and/or combined by scanner 102 to produce one or more results 114 which can be stored 112 in security database 110 (also referred to herein as a "data store") as described herein. For example, scanner 102 can utilizes one or more match expressions to automatically determine potential one or more strings of characters within the response that are potential vulnerabilities. For example, match expressions can be one or more sequences of characters that define one or more search patterns. In some examples, the match expressions can include one or more combinations of logic statements and regular expressions. The potential vulnerabilities can then be verified (e.g., vulnerability or false positive).

As used herein, security database 110 can be a database, a data store, a flat file, a hierarchical file system, a document storage system, or some other data storage schema. Results 114 can include potential vulnerabilities (e.g., tokenized, etc.) for site 106, any associated metadata and can also include one or more derived results based on data obtained from other sites and/or stored in security database 110. The data store can also include verifications and remediation options for the one or more stored vulnerabilities. In some examples, the verifications and remediation options can be determined by an operator, when the verifications and remediation options have been tested and confirmed.

FIG. 1B illustrates an example machine learning environment 150 for scanning a site. As previously described, scanner 102 can perform scanning operations 108 on site 106. Results 114 (e.g., HTTP response, forms, etc.) of the scanning operation can be returned to the scanner. When neural network 160 is trained, results 114 can be transmitted 120 to neural network 160 to verify if results 114 is a vulnerability. Neural network 160 can respond 116 with verification of the vulnerability. In some examples, the results can be tokenized before being transmitted to the neural networks. In some examples, the verification can include a confidence score. The confidence score can include a percentage or ratio of confidence that the verification provided by the neural network is accurate. The scanner can include a threshold confidence score, where when the confidence score is greater than or equal to the threshold the verification is considered correct. When the confidence score is below the threshold, a notification can be transmitted to an operator. In some examples, the verification, if successful, can also include remediation options.

FIG. 1B also illustrates training of the neural network via security database 118.

Security database 118 can include historical scan data sets, for example, scan data from one or more sites over a period of time. The historical scan data sets can include the vulnerability, identifier, verification, remediation options, relationship to other vulnerabilities, etc. The historical data sets can be continuously updated with each scan. The vulnerabilities detected (e.g., historically) can be stored in the data store, along with associated metadata. Each vulnerability can have an identifier. The identifier can be unique to the vulnerability. The corresponding metadata can also be used in identifying the potential vulnerability. When the vulnerability is being stored in the data store, the data store can determine if the vulnerability has been previously identified (via the identifier). If the vulnerability has previously been identified, the data store (e.g., via scanner or other computing device) can determine if verification options and remediation options that corresponding to the potential vulnerability are stored at the data store. When verifications and remediation options that correspond to the potential vulnerability exist, during the store operation the verification options and remediation options can be associated with the newly stored potential vulnerability and the associated metadata. When verifications and remediation options do not exist, a notification can be set to the operator for further manual investigation. Subsequent, the vulnerability and associated data can be stored. In some examples, the verifications can determine the potential vulnerability is not a vulnerability, for example a false positive. An example historical scan data is illustrated in FIG. 3.

FIG. 2A illustrates an example environment 200 for performing security scans as described herein in connection with FIG. 1A. The different security scans can have a level of detail based at least in part on the site being scanned and/or based at least in part on a level of service (also referred to herein as a "service level") associated with the site being scanned. For example, a site operator can operate a site with a low service level, which can indicate that the site can only be scanned with a surface scan or with simple and/or inexpensive scans. A site operator can also operate a site with a medium service level, which can indicate that the site can be scanned with more detailed scans. A site operator can operate a site with a high service level, which can indicate that the site can be scanned with a still more detailed scans. Examples of such scans include login scans (i.e., a scans that are authenticated to the site) and forms scans (i.e., a scan that attempts to use and/or misuse forms associated with the site). For example, a medium service level can indicate the performance of login scans and forms scans and all sites with a medium service level can have such scans performed while a high service level can indicate the performance of login scans and forms scans, plus the performance of manual scans, simulated attacks, or other such additional data gathering techniques. Different service levels can correspond to different scan configurations so, for example, the highest service level can include regular surface scans, regular detailed scans, regular login scans, regular forms scans, and regular detailed scan analysis. In some examples, there can be a custom service level, which can include one or more scan operations selected by the operator. While the examples illustrate a single scanner, this is not limiting, and multiple scanner are appreciated, for example, each neural network can have one or more associated scanners.

In the first example illustrated in FIG. 2A for performing one or more surface scan operations 204 on site 206. Surface scan operations 204 (also referred to herein as unauthenticated scans or scans that perform no form submissions) can be configured to only access publicly available interfaces and/or obtain publicly available information associated with site 206. The surface scan operations can be configured to use information that is available without an agreement with the site operator, without login credentials, without knowledge of the forms associated with the site, or without other such privileged information (e.g., similar to the level of penetration of a website that might be performed by, for example, a web crawler application). The surface scan operations can also be configured to gather information about a site and/or to correlate relations between sites. A surface scan can also be configured to look for vulnerabilities. Publicly available interfaces (e.g., web-based application programming interfaces) can allow the surface scan to query site 206 for information. The publicly available information associated with site 206 can be obtained from site 206 or can also be obtained from a third party. For example, various web search engines collect data associated with a site that can be made available to a query to those web search engines.

Surface scan operations 204 might not be configured to access privileged information associated with site 206 including, for example, forms on site 206, the version of the operating system of site 206, or other such privileged information. Surface scan operations 204 can be configured to record instances where information that should not be publicly available from the site 206 is publicly available to the surface scan. Result 208 of the surface scan operations 204 can be stored 210A in security database 212 in a scan record associated with an identifier of the site 206 and also associated with the time of the one or more surface scan operations 204. The result can also include potential vulnerabilities for verification.

In the second example illustrated in FIG. 2A for performing one or more detailed scan operations 214 of site 216 which can be operated by a site operator as described herein. Detailed scan operations 214 can be configured to obtain information similar to the information obtained from a scan such as surface scan operations 204 and can also be configured to obtain additional information about site 216. Detailed scan operations 214 of site 216 can be configured to obtain this additional information because scanner 202 can be provided with credentials and/or application programming interface ("API") access by the site operator. Scanner 202 can be provided with credentials by the site operator to make an API call to site 216 to obtain this additional information. For example, a site operator can have information regarding PCI DSS compliance for site 216 and can be configured to provide that information to scanner 202 in response to detailed scan operations 214. Result 220 of detailed scan operations 214 can also be stored 222A in security database 212 in a scan record associated with an identifier of site 216 and/or with the time of detailed scan operations 214. The result can also include potential vulnerabilities for verification.

The other examples illustrated in FIG. 2A show more detailed scans based upon a level of service associated with a site operator and/or one or more sites. Scanner 202 can perform one or more login scan operations 224 that can be based on credentials for site 226 provided by a site operator. For example, login scan operations 224 can be configured with functionality to allow scanner 202 to execute operations to login 228 to site 226 and to perform one or more privileged operations to gather additional security information associated with site 226. Result 230 of login scan operations 224 can then be stored 232A in security database 212 as described herein. The result can also include potential vulnerabilities for verification.

The site operator can also provide form layout information for forms 236 associated with site 226 to allow scanner 202 to perform one or more forms scan operations 234 associated with site 226. Forms scan operations 234 can be configured to access the forms associated with the site 226, to use the form layout information to programmatically fill in the forms, and to use the results of the filling in those forms to gather additionally detailed security information. Forms scan operations 234 can also include automatic forms training wherein the scanner determines form layout information. Forms scan operations 234 can also include manual forms training wherein an operator of the scanner determines form layout information. Results 238 of forms scan operations 234 can be stored 240A in security database 212 as described herein. The result can also include potential vulnerabilities for verification.

In some embodiments, the scanner has credentials from the site operator to access highly privileged data to perform detailed analysis data 242 from site 244. In such embodiments, detailed analysis data 242 is used by scanner 202 to perform detailed analysis 246 of the security of site 244 that can provide the most detailed security information associated with the site. The results of this detailed analysis can be stored 248A in security database 212 as described herein. The result can also include potential vulnerabilities for verification.

In some embodiments, scanner 202 can perform code scan 252 (e.g., static code analysis, dynamic code analysis, etc.) on application code 254 (e.g., source code, machine code, representations of code, etc.). In such embodiments, scan code 252 is used by scanner 202 to perform a scan of application code 254 that can provide potential vulnerabilities in application source code 254. Results 256 (e.g., potential vulnerabilities) of this code scan can be stored 258A in security database 212.

FIG. 2B illustrates an example machine learning environment 250 for performing security scans as described herein in connection with FIG. 1. As previously described, scanner 202 can perform scanning operations (e.g., 204, 214, 224, 234, 242, etc.) on one or more sites (e.g., 206, 216, 226, 244, etc.). Results (e.g., 208, 220, 230, 238, 246, etc.) of the scanning operations can be returned to the scanner. In some examples, scanner 202 can be more than one scanner, for example each neural network can have one or more associated scanners. The results can be transmitted (e.g., 210B, 222B, 232B, 240B, 248B, 258B etc.) to one or more neural networks (e.g., 260A, 260B, 260C, 260D, 260E, 260F, etc.). The neural networks can be, but are not limited to convolutional neural network (e.g., character-based, etc.), recurrent neural networks (e.g., long short term memory, etc.), etc. The convolutional neural networks (CNN) can classify the input text utilizing parameters such as length of the input array of numbers, vocabulary and convolutional filter configuration to enable vulnerability detection and verification. CNNs can be directly applied to distributed or discrete embedding of words, without any knowledge on the syntactic or semantic structures of a language. CNNs can also use character-level features for language processing, for example, using character-level n-grams with linear classifiers and incorporating character-level features to CNNs. In particular, these approaches use words as a basis, in which character-level features extracted at word or word n-gram level form a distributed representation. The long short term memory networks (LSTMN) can classify, process and predict time series given time lags of unknown size and duration between important events (e.g., vulnerabilities, etc.). LSTMNs are popular in processing Natural Language Processing (NLP) tasks because of its recurrent structure, that is very suitable to process variable-length text, for example, distributed representations of words by first converting the tokens comprising each text into vectors, which form a matrix that can include two dimensions: the time-step dimension and the feature vector dimension.

The one or more neural networks can be trained and correlated based on the type of scanning operation. For example, neural network 260A can correlate to surface scan operations 204, neural network 260B can correlate to detailed scan operations 214, neural network 260C can correlate to login scan operations 224, neural network 260D can correlate to form scan operations 234, neural network 260E can correlate to detailed analysis data 242, and so forth. In some examples, each scan operation can have one or more trained neural networks to ensure a higher confidence level. That is, the neural networks can be specifically trained by sets of data in order to provide highly accurate results for the types of data sets used to train the network. In response to receiving results (e.g., 210B, 222B, 232B, 240B, 248B, 258B, etc.) from a scan operation, the neural network (e.g., when trained) can provide responses (e.g., 262, 264, 266, 268, 270, 282, etc.) to the scanner. The responses can include verification of the vulnerability. The results and responses can also be stored in security database 212 to train future networks. In some examples, the results can first be tokenized before being transmitted to the neural network.

Each neural network can be trained from historical data from security database 212 as described above. For example, historical data classified as a surface scan can be transmitted 272 to train neural network 260A, historical data classified as a detailed scan can be transmitted 274 to train neural network 260B, historical data classified as a login scan can be transmitted 276 to train neural network 260C, historical data classified as a form scan can be transmitted 278 to train neural network 260D, historical data classified as a detailed analysis can be transmitted 280 to train neural network 260E, historical data classified as code analysis can be transmitted 284 to train neural network 260F, and so forth. The training data (and the training process itself, as will be later described) can be adjusted for various categories of machine learning, including supervised learning, unsupervised learning, semi-supervised learning, reinforcement learning, etc.

FIG. 3 illustrates example entries 300 in security database (e.g., 112, 212, etc.). The entries in the database can be the results of a scan of a site (e.g., after a match from match expression), along with supervised input (e.g., from an operator). For example, site A could be scanned at a first time of a scan type login. The scan could result in a potential vulnerability (e.g., shown in the HTTP request/response pair). This vulnerability could be verified by an operator (e.g., verified—Yes). In some examples, the vulnerability could be verified by a neural network that has been trained. In some examples, the vulnerability could be a false positive (e.g., not a vulnerability). The operator could also supply potential remediation options (e.g., patch versions, API updates, etc.). The database can also include associated metadata with the scan of a site, for example, the URL (uniform resource locator) or code scanned, login information, forms fields scanned, test id (e.g., the test or scan performed by the scanner, etc.). When a neural network is trained, new vulnerabilities can be identified and verified by correlations to the data sets (e.g., shown in FIG. 3) used to train the neural network. The compilation of this data can be stored as one or more entries in the database. The potential vulnerabilities can be stored in the database at different lengths (of input array of characters) of the excerpts of the response. For example, when the matched expression is 5 bytes in length, the potential vulnerability stored can include extra characters on either side of the 5 bytes. The length of input array of characters can be of varied length (e.g., powers of 2-128, 256, 512, 1024, 2048, 4096, etc.). The varied lengths can be used to train one or more neural networks (shown below). The different lengths of input array of characters can enable the neural network to derive hidden relationships between the structures of the text (e.g., in the length) and the vulnerability. For example, some lengths of input array of characters might be more suited for verifying vulnerabilities and/or deriving hidden relationships of detail scans, while other lengths of input array of characters might be more suited of login or surface scans. Multiple neural networks can be trained at varying lengths of input array of characters to determine the length of input array of characters which provided the highest accuracy (e.g., confidence) in the verification.

The method shown in FIG. 4 is provided by way of example, as there are a variety of ways to carry out the method. Additionally, while the example method is illustrated with a particular order of blocks, those of ordinary skill in the art will appreciate that FIG. 4 and the blocks shown therein can be executed in any order that accomplishes the technical advantages of the present disclosure and can include fewer or more blocks than illustrated.

Each block shown in FIG. 4 represents one or more processes, methods or subroutines, carried out in the example method. The blocks shown in FIG. 4 can be implemented in the examples environment shown in FIGS. 1A-2B. The flow chart illustrated in FIG. 4 will be described in relation to and make reference to at least the elements of neural networks 160/260 shown in FIGS. 1B and 2B.

FIG. 4 shows a flow diagram of an example method 400 for training a neural network. Method 400 can begin at block 402. At block 402, one or more scan operations can be transmitted, from a computing system (e.g., scanner, etc.) to one or more sites. For example, the one or more scan operations can be of different scan types as illustrated in FIG. 2B. In some examples, the scan operations can be HTTP requests. In some examples, the scan operations can be static or dynamic code analysis commands. At block 404, one or more responses to the one or more scan operations can be received. For example, the one or more responses can be HTTP responses. In other examples, the responses can be results of the static or dynamic code analysis.

At block 406, the potential vulnerabilities can be verified. For example, the potential vulnerabilities can be verified, when it is confirmed the potential vulnerability is an actual vulnerability and not, for example, a false positive. The verification can be performed by an analysis of the text of the vulnerability with text of known vulnerabilities or pattern recognition processes of the text. For example, a match expression of the response can determine potential vulnerabilities—that is, strings in the response that could be vulnerabilities, but may not be. The match expressions are designed to capture a broad range of potential vulnerabilities, since vulnerabilities can vary in how they are presented in the response and/or code. That is, the match expressions capture a broad range of potential vulnerabilities, as to avoid initial misidentifying a potential vulnerability that could subsequently be verified as a vulnerability or false positive. In some examples, the match expressions can be finer tuned, however, the risk of missing a potential vulnerability would increase the more finer tuned the matched expressions becomes. In other examples, verification, before a neural network is trained, can be performed manually. When the potential vulnerabilities are verified, the tokenized responses, associated metadata, vulnerability, verification, etc. can be stored in the security database.

At block 410, the verified vulnerability be used to train the neural network. For example, the response can be prepared for input into one or more neural networks (e.g., to train a neural network, to identify vulnerabilities, etc.). The training of the neural network can also include historical data, for example, stored in the security database (or other data storage). The historical data can also be verified in order to maintain and properly train the neural network for detecting and verification future potential vulnerabilities. In some examples, the HTTP reply/response pairs, along with the verification, metadata, and remediation data (as shown in FIG. 3) can be used as input into the neural network. In some examples, more than one neural network can be trained, for example, based on a fixed length of input array of numbers (e.g., tokenized string of characters used as input into a neural network) extracted from the HTTP reply/response pairs. For example, the neural network can be trained, by mapping the received inputs (the strings extracted from HTTP reply/responses) with the outputs (verified vulnerability or false positive). In some examples, the lengths of array of numbers can be, for example, powers of 2-128, 256, 512, 1024, 2048, 4096, etc. During this training process, the neural network can learn hidden patterns between the inputs and outputs, and combination thereof, to enables the neural network, when trained, to predict outputs of inputs that it has not previously received.

The method shown in FIGS. 5A-C are provided by way of examples, as there are a variety of ways to carry out the methods. Additionally, while the example methods are illustrated with a particular order of blocks, those of ordinary skill in the art will appreciate that FIGS. 5A-C and the blocks shown therein can be executed in any order that accomplishes the technical advantages of the present disclosure and can include fewer or more blocks than illustrated.

Each block shown in FIGS. 5A-C represents one or more processes, methods or subroutines, carried out in the example method. The blocks shown in FIGS. 5A-C can be implemented in the examples environment shown in FIGS. 1A-2B. The flow chart illustrated in FIGS. 5A-C will be described in relation to and make reference to at least the elements of neural networks 160/260 shown in FIGS. 1B and 2B.

FIG. 5A shows a flow diagram of an example method 500 for detecting and verifying vulnerabilities by a neural network. Method 500 can begin at block 502. At block 502, one or more scan operations can be transmitted, from a computing system (e.g., scanner, injector, etc.) to one or more sites. For example, the one or more scan operations can be of different scan types as illustrated in FIG. 2B. In some examples, the scan operations can be HTTP requests. In some examples, the scan operations can be static or dynamic code analysis commands. At block 504, one or more responses to the one or more scan operations can be received. For example, the one or more responses can be HTTP responses. In other examples, the responses can be results of the static or dynamic code analysis.

At block 506, potential vulnerabilities can be determined from the received response and the response can be tokenized. For example, the match expression of the response determines potential vulnerabilities—that is, strings in the response that could be vulnerabilities, but may not be. The match expressions are designed to capture a broad range of potential vulnerabilities, since vulnerabilities can vary in how they are presented in the response and/or code. That is, the match expressions capture a broad range of potential vulnerabilities, as to avoid initial misidentifying a potential vulnerability that could subsequently be verified as a vulnerability or false positive. In some examples, the match expressions can be finer tuned, however, the risk of missing a potential vulnerability would increase the more finer tuned the matched expressions becomes. The tokenization can uniquely identify the vulnerability. In some examples, the tokenization can create a unique identifier of the vulnerability. In other examples, strings of different sizes can be extracted from the response centering on the vulnerability and then can be tokenized for vulnerability determination by the neural network. For example, the lengths of strings before the tokenization process can be, for example, powers of 2-128, 256, 512, 1024, 2048, 4096, etc. In some examples, the tokenization can include breaking the strings into characters and translating strings into arrays of integers using the custom vocabulary (and then used as input into a neural network for verification). In some examples, the response can be prepared for input into one or more neural networks (e.g., to identify and verify vulnerabilities, etc.). An example tokenization process is illustrated in method 525 of FIG. 5B.

At block 508, the potential vulnerabilities can be verified. For example, the potential vulnerabilities can be verified, when it is confirmed a potential vulnerability is an actual vulnerability and not, for example, a false positive. The verification can be performed by an analysis of the text of the vulnerability with text of known vulnerabilities or pattern recognition processes of the text (for example, via neural networks). The tokenized potential vulnerabilities (e.g., string of characters) can be transmitted to one or more neural networks, trained, for example at different lengths of input array of numbers (e.g., excerpts). In some examples, a plurality of neural networks can be trained to each receive different lengths (of numbers in an array) of the tokenized potential vulnerabilities. Each of the plurality of neural networks can verify the potential vulnerability, that is, whether the potential vulnerability is an actual vulnerability or a false positive. In some examples, different lengths of input array of numbers can provide more accurate result (e.g., higher confidence of an actual vulnerability or false positive). In some examples, certain lengths of input array of numbers can be better suited for verifying certain vulnerabilities. In other examples, combinations of neural networks (at different lengths of input array of numbers) can be provide a higher confidence of accuracy for verifying certain type of vulnerabilities. An example of verification is illustrated in method 450 of FIG. 5C. When the potential vulnerabilities are verified, the tokenized responses, associated metadata, vulnerability, verification, etc. can be stored in the security database.

At block 510, a determination can be made as to whether the confidence level of the verification is greater than or equal to a threshold confidence. For example, a threshold confidence can be set at a percentage or ratio in which it is determined the identification and/or verification from the neural network is correct. The threshold confidence can have a default setting, can be manually set or can be set based of usage of the neural network. For example, the more the neural network has been used and has provided accurate results (e.g., negligible number of false positives), the lower then threshold confidence can be set while still provided accurate results. When the confidence level of the verification is less than the threshold confidence, the verification is considered unfit for automated verification and a notification is transmitted to the operator for further review. When the confidence level of the verification is equal or greater than the threshold confidence, the verification of the vulnerability can be correctly classified as either real vulnerability or a false positive and the method can proceed to processing the next potential vulnerability. In some examples, when verification is correct remediation options can be automatically implemented and/or a notification of the remediation options can be transmitted to the operator.

In some instances, the neural network can determine a confidence level of the potential vulnerability. For example, the neural networks can output either a 0 or a 1 for a given input (e.g., 0 is for a false positive, 1 is for a real vulnerability). In some examples, the neural network can provide a percentage or ratio of the accuracy the potential vulnerability is a real vulnerability or a false positive. For example, the neural network previously "seen" inputs (e.g., potential vulnerabilities), the output can be very close to 0 or 1, but for previously "unseen" inputs (e.g., potential vulnerabilities), the output can be a set of neural network operations (e.g., on the tokenized input) that provided a number between 0 and 1. This number can be taken as the confidence level. For example, when the confidence level is 0.8, that is taken as 80% confident the potential vulnerability is a real vulnerability. In an example where the threshold is set to 80%, all outputs greater or equal to 80% can be outputted as a real vulnerability and all outputs less than 20% can be outputted as a false positives and the remainder can be sent to the operator for verification. In some examples, the neural network can output two values (e.g., that when summed equal 1). For example, the neural network can output a first value related to the potential vulnerability being an actual vulnerability and a second value related to the potential vulnerability being a false positive. The ratio of the first value and second value can be the confidence level.

FIG. 5B illustrates an example method 525 for tokenizing the received response. At block 512, one or more vulnerabilities can be automatically identified (e.g., via the match expression) in the response. For example, the match expression of the response determines potential vulnerabilities—that is, strings in the response that could be vulnerabilities, but may not be. The match expressions are designed to capture a broad range of potential vulnerabilities, since vulnerabilities can vary in how they are presented in the response and/or code. That is, the match expressions capture a broad range of potential vulnerabilities, as to avoid initial misidentifying a potential vulnerability that could subsequently be verified as a vulnerability or false positive. In some examples, the match expressions can be finer tuned, however, the risk of missing a potential vulnerability would increase the more finer tuned the matched expressions becomes. For example, the vulnerabilities can be identified in the text and/or headers of the response (e.g., HTTP response). If no vulnerability is identified at block 514, the method can return to block 502 to proceed with the next scan. When a vulnerability is found at block 514, the method can proceed to block 516. At block 516, one or more lengths of input array of characters can be determined. For example, a length of input array of characters can be a length of characters before, after and including the vulnerability. In some examples, the response can be an HTTP response, and the length of input array of characters can include at least characters of a status line, header, and body of the HTTP response. The length of input array of characters can be based on the one or more neural networks to be trained and/or used to verify a potential vulnerability. For example, neural networks can have inputs of fixed length (e.g., size, number of characters, etc.) and as such, the length of input array of characters can be determined based on which neural network(s) are to be used in the training and/or verification. In some examples, multiple lengths and/or neural networks can be utilized, for example, different lengths of input array of characters can produce different accuracies in outputs from the neural networks. In some examples, the responses can be portions of scanned source code and/or representations thereof. In some examples, the lengths of input array of characters can be, for example, powers of 2-128, 256, 512, 1024, 2048, 4096, etc. In some examples, even if a vulnerability is not identified, the response can be tokenized and used to train the neural network to detect false positives.

At block 518, excerpts of the response, including the potential vulnerability can be taken at the determined lengths of input array of characters. In an example when the length is 128 bytes, and the vulnerability is 64 bytes, the excerpt can be the 32 bytes before the vulnerability, the 64 byte vulnerability and the 32 bytes after the vulnerability. In some examples, the vulnerability can be offset in the excerpt. The offset can be calculated based on a set of bytes and/or a factor.

At block 520, the one or more excerpts can be tokenized. For example, the tokenization can be character based where the excerpt including the vulnerability can be broken into separate characters and then translated into integers by hash function, MD5, memorization, etc. In some examples, the tokenization can be customized based on breaking the excerpt by HTML tag boundary, space boundary, regular expression using a delimiter and then applying the translation as explained in the above example.

In some examples, the tokenization of the one or more excerpts can be identifiers for the one or more excerpts. In some examples, the characters of the excerpt can be replaced by characters of different values. In some examples, the characters of different values can be more or less characters than the characters in the excerpts. The identifiers, along with other associated information can be stored in the security database or used as input to train a neural network for identification and verification of the vulnerability. When the vulnerability is tokened the method 525 can return to block 506 of method 4500.

FIG. 5C illustrates example method 550 of the verification process of a potential vulnerability. At block 522, a real vulnerability can be identified by the neural network. For example, the tokenized response (e.g., of the potential vulnerability) can be used as input into one or more neural networks to verify the potential vulnerability (e.g., real or false positive). For example, one or more trained neural networks can receive the tokenized response (e.g., one or more potential vulnerabilities at varying length of input array of characters). The one or more trained neural networks can receive the tokenized response and verify if the potential vulnerability is an actual vulnerability or a false positive. Each trained neural network can be trained to receive the potential vulnerability at a different length of input array of characters. At block 524, a determination can be made was to whether a vulnerability is verified or a false positive (e.g., via the trained neural network). When there is not a confident match, a notification can be transmitted to an operator at block 426. When there is a match, the method can proceed to back to block 408.

In other examples, the tokenized response(s) can be transmitted to the neural network. The neural network, in this instance, can be a trained neural network, that is, able to provide identification and/or verification of the potential vulnerability which is tokenized. Upon receiving the tokenized response, the neural network can determine, whether the potential vulnerability is a vulnerability or a false positive. For example, the neural network can use character-level classification and analysis to determine whether the potential vulnerability contained within the tokenized response(s) (at the varying lengths of input array of characters) was previously identified and verified through the historical data used to train the network. The neural network can also analyze the text present in the varying lengths of input array of characters around the vulnerability to determine if hidden relationships exist around potential vulnerabilities. For example, a potential vulnerability could be unknown in its current form (but previously known in another form), but the text present around the unknown vulnerability can be analyzed to determine the potential vulnerability is a vulnerability, in a different form, that requires further consideration based on character correlation between the surrounding text. A response, to the transmitted tokenized response, can be transmitted to the scanner). When the potential vulnerability has been identified and/or verified, a verification and confidence level for that verification can be received. When the potential vulnerability has not been verified, a false positive can be returned, along with a notification to the operator for investigation into the false positive. Upon review of the operator, the false positive can be used to further train the neural network for future verification processes. FIG. 6 shows an example of computing system 600 in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) and random access memory (RAM) to processor 610. Computing system 600 can include a cache of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

Methods according to the aforementioned description can be implemented using computer-executable instructions that are stored or otherwise available from computer readable media. Such instructions can comprise instructions and data which cause or otherwise configure a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

The various embodiments further can be implemented in a wide variety of operating environments, which in some cases can include one or more user computers, computing devices or processing devices, which can be used to operate any of a number of applications. User or client devices can include any of a number of general-purpose personal computers, such as desktop, laptop or tablet computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network. These devices can also include virtual devices such as virtual machines, hypervisors and other virtual devices capable of communicating via a network.

Various embodiments of the present disclosure can utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of servers or mid-tier applications, including Hypertext Transfer Protocol ("HTTP") servers, Hypertext Transfer Protocol Secure ("HTTPS") servers, Transport Layer Security ("TLS") servers, SPDY™ servers, File Transfer Protocol ("FTP") servers, Common Gateway Interface ("CGI") servers, data servers, Java servers, Apache servers, Internet Information Services ("IIS") servers, Zeus servers, Nginx servers, lighttpd servers, proxy servers (e.g., F5®, Squid, etc.), business application servers, and other servers (e.g., Incapsula™, CloudFlare®, DOSarrest, Akamai®, etc.). The server(s) can also be capable of executing programs or scripts in response to requests from user devices, such as by executing one or more web applications that can be implemented as one or more scripts or programs written in any programming language, such as Java®, C, C# or C++, or any scripting language, such as Ruby, PHP, Perl, Python®, JavaScript®, or TCL, as well as combinations thereof. The server(s) can also include database servers, including without limitation those commercially available from Oracle®, Microsoft®, Sybase®, and IBM® as well as open-source servers such as MySQL, NoSQL, Hadoop, Postgres, SQLite, MongoDB, and any other server capable of storing, retrieving, and accessing structured or unstructured data. Database servers can include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network ("SAN") familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system can also include one or more storage devices, such as disk drives, optical storage devices and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets) or both. Further, connection to other computing devices such as network input/output devices can be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes can be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set can be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., can be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. The code can be stored on a computer-readable storage medium, for example, in the form of a computer program comprising a plurality of instructions executable by one or more processors. The computer-readable storage medium can be non-transitory (referred to herein as a "non-transitory computer-readable storage medium") and/or can be tangible (referred to herein as a "tangible non-transitory computer-readable storage medium").

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments can become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system for verifying vulnerabilities, the system comprising:
   a processor; and
   a computer-readable medium storing instructions, which when executed by the processor causes the processor to:
      transmit one or more scan operations to scan for potential vulnerabilities of one or more sites;
      receive one or more responses to the one or more scan operations including at least one potential vulnerability of the potential vulnerabilities;
      tokenize the one or more responses in to one or more input arrays of varied lengths;
      transmit, to one or more neural networks of a plurality of neural networks based on the varied lengths of the one or more input arrays, the one or more tokenized responses, wherein a first neural network of the plurality of neural networks is configured to receive an input array of a first length of the varied lengths and a second neural network of the plurality of neural networks is configured to receive an input array of a second length of the varied lengths;
      receive, from the one or more neural networks, verification of the one or more tokenized responses; and
      determine one or more confidences of the one or more verified responses.

2. The system of claim 1, wherein the one or more scan operations are one or more hypertext transport protocol requests and the one or more responses are one or more hypertext transport protocol responses.

3. The system of claim 1, further comprising instructions which when executed by the processor causes the processor to:
   automatically identify one or more potential vulnerabilities in the one or more responses;
   in response to the identification of the one or more potential vulnerabilities, determine the varied lengths, wherein the varied lengths are associated with the one or more input arrays;
   take one or more excerpts of the one or more responses of the varied lengths; and
   convert the one or more excerpts into one or more tokens.

4. The system of claim 3, wherein the identification is performed using matched expressions.

5. The system of claim 1, wherein the one or more neural networks are trained by historical request and response pairs.

6. The system of claim 1, wherein the one or more neural networks are one of character-level convolutional neural networks or long short term memory recurrent neural networks.

7. The system of claim 1, wherein the one or more confidences associated with the one or more verified responses are based on a ratio the one or more neural networks have properly identified the one or more potential vulnerabilities.

8. The system of claim 1, wherein tokenizing the one or more responses comprises:
   taking at least one excerpt of the one or more responses at the specific length, wherein the at least one excerpt includes the at least one potential vulnerability.

9. A computer-implemented method for verifying vulnerabilities, the method comprising:
   transmitting, by a scanner, one or more scan operations to scan for potential vulnerabilities of one or more sites;
   receiving, at the scanner, one or more responses to the one or more scan operations including at least one potential vulnerability of the potential vulnerabilities;
   tokenizing, by the scanner, the one or more responses in to one or more input arrays of varied lengths;
   verifying, by one or more neural networks of a plurality of neural networks based on the varied lengths of the one or more input arrays, the one or more tokenized responses, wherein a first neural network of the plurality of neural networks is configured to receive an input array of a first length of the varied lengths and a second neural network of the plurality of neural networks is configured to receive an input array of a second length of the varied lengths; and
   determining one or more confidences of the one or more verified responses.

10. The method of claim 9, wherein the one or more scan operations are one or more hypertext transport protocol requests and the one or more responses are one or more hypertext transport protocol responses.

11. The method of claim 9, wherein the tokenizing further comprising:
    automatically identifying one or more potential vulnerabilities in the one or more responses;
    in response to identifying the one or more potential vulnerabilities, determining the varied lengths, wherein the varied lengths are associated with the one or more input arrays;
    taking one or more excerpts of the one or more responses of the varied lengths; and
    converting the one or more excerpts into one or more tokens.

12. The method of claim 11, wherein the identifying is performed using matched expressions.

13. The method of claim 9, wherein the one or more neural networks are trained by historical request and response pairs.

14. The method of claim 9, wherein the one or more neural networks are one of character-level convolutional neural networks or long short term memory recurrent neural networks.

15. The method of claim 9, wherein the one or more confidences associated with the one or more responses are based on a ratio the one or more neural networks have properly identified the one or more potential vulnerabilities.

16. The method of claim 9, wherein tokenizing the one or more responses further comprising:
    taking at least one excerpt of the one or more responses at the specific length, wherein the at least one excerpt includes the at least one potential vulnerability.

17. A non-transitory computer-readable medium storing instructions, which when executed by a processor causes the processor to:
    transmit one or more scan operations to scan for potential vulnerabilities of one or more sites;
    receive one or more responses to the one or more scan operations including at least one potential vulnerability of the potential vulnerabilities;

tokenize the one or more responses in to one or more input arrays of varied lengths;

transmit, to one or more neural networks of a plurality of neural networks based on the varied lengths of the one or more input arrays, the one or more tokenized responses, wherein a first neural network is configured to receive an input array of a first length of the varied lengths and a second neural network is configured to receive an input array of a second length of the varied lengths;

receive, from the one or more neural networks, verification of the one or more tokenized responses; and determine one or more confidences of the one or more verified responses.

18. The non-transitory computer-readable medium of claim 17, wherein the one or more scan operations are one or more hypertext transport protocol requests and the one or more responses are one or more hypertext transport protocol responses.

19. The non-transitory computer-readable medium of claim 17, further comprising instructions which when executed by the processor causes the processor to:

automatically identify one or more potential vulnerabilities in the one or more responses;

in response to the identification of the one or more potential vulnerabilities, determine the varied lengths, wherein the varied lengths are associated with the one or more input arrays;

take one or more excerpts of the one or more responses of the varied lengths; and convert the one or more excerpts into one or more tokens.

20. The non-transitory computer-readable medium of claim 19, wherein the identification is performed using matched expressions.

21. The non-transitory computer-readable medium of claim 17, wherein the one or more neural networks are trained by historical request and response pairs.

22. The non-transitory computer-readable medium of claim 17, wherein the one or more neural networks are one of character-level convolutional neural networks or long short term memory recurrent neural networks.

23. The non-transitory computer-readable medium of claim 17, wherein the one or more confidences associated with the one or more responses are based on a ratio the one or moreneural networks have properly identified the one or more potential vulnerabilities.

24. The non-transitory computer-readable medium of claim 17, wherein tokenizing the one or more responses comprises:

taking at least one excerpt of the one or more responses at the specific length, wherein the at least one excerpt includes the at least one potential vulnerability.

* * * * *